United States Patent
Schien et al.

(10) Patent No.: US 7,597,812 B2
(45) Date of Patent: Oct. 6, 2009

(54) METHODS AND SYSTEMS FOR CONVERTING WASTE INTO ENERGY

(75) Inventors: Kent F. Schien, Chesterfield, MO (US); Scott A. Moseley, Vinita Park, MO (US); Gary E. Winkler, St. Louis, MO (US)

(73) Assignee: Innoventor Engineering, Inc., St. Louis, MO (US)

( * ) Notice: Subject to any disclaimer, the term of this patent is extended or adjusted under 35 U.S.C. 154(b) by 468 days.

(21) Appl. No.: 11/506,011

(22) Filed: Aug. 17, 2006

(65) Prior Publication Data

US 2006/0278587 A1  Dec. 14, 2006

Related U.S. Application Data

(62) Division of application No. 10/812,153, filed on Mar. 29, 2004, now Pat. No. 7,105,088.

(51) Int. Cl.
*C02F 9/08* (2006.01)
*C02F 11/12* (2006.01)

(52) U.S. Cl. .................. 210/770; 210/800; 210/805; 210/806; 110/224

(58) Field of Classification Search .............. 210/767, 210/768, 770, 771, 774, 800, 805, 806; 34/380, 34/397, 398, 443, 86; 73/73; 110/219, 221, 110/224
See application file for complete search history.

(56) References Cited

U.S. PATENT DOCUMENTS

| | | | |
|---|---|---|---|
| 4,184,892 A | | 1/1980 | Anderson |
| 4,290,269 A | * | 9/1981 | Hedstrom et al. ............. 60/670 |
| 4,321,151 A | * | 3/1982 | McMullen .................. 210/769 |
| 4,344,770 A | * | 8/1982 | Capener et al. ............... 44/388 |
| 4,750,454 A | * | 6/1988 | Santina et al. ................. 123/3 |
| 4,818,405 A | * | 4/1989 | Vroom et al. ................ 210/603 |
| 4,842,728 A | * | 6/1989 | Baker .......................... 210/180 |
| 5,269,947 A | * | 12/1993 | Baskis ......................... 210/774 |
| 5,360,553 A | * | 11/1994 | Baskis ......................... 210/774 |
| 5,500,306 A | | 3/1996 | Hsu et al. |
| 5,552,044 A | * | 9/1996 | Abel ............................ 210/252 |
| 5,589,599 A | * | 12/1996 | McMullen et al. .......... 585/240 |
| 6,036,774 A | * | 3/2000 | Lieber et al. ................. 117/105 |
| 6,054,044 A | * | 4/2000 | Hoffland et al. ............. 210/96.1 |
| 6,149,694 A | * | 11/2000 | Redden et al. ................. 44/552 |
| 6,190,566 B1 | * | 2/2001 | Kolber ........................ 210/744 |
| 6,299,774 B1 | | 10/2001 | Ainsworth et al. |
| 6,398,921 B1 | * | 6/2002 | Moraski ................. 204/157.43 |
| 6,410,283 B1 | * | 6/2002 | Rehmat et al. .............. 435/167 |

(Continued)

FOREIGN PATENT DOCUMENTS

EP  1182248 A1 *  2/2002

(Continued)

*Primary Examiner*—Frank M Lawrence
(74) *Attorney, Agent, or Firm*—Armstrong Teasdale LLP

(57) ABSTRACT

A method for receiving animal waste from animal confinements or other concentrated animal waste sources and for converting the waste into a usable form is described. The waste contains both liquids and solids. The method includes separating the liquids and solids into separate waste streams, controlling an amount of moisture in the solids waste stream such that the amount of moisture in the solid waste stream is compatible with a selected energy conversion process, and feeding the moisture controlled solid waste into the energy conversion process.

12 Claims, 8 Drawing Sheets

U.S. PATENT DOCUMENTS

| | | | | |
|---|---|---|---|---|
| 6,470,828 | B1 * | 10/2002 | Townsend et al. | 119/447 |
| 6,521,129 | B1 * | 2/2003 | Stamper et al. | 210/603 |
| 6,531,057 | B1 * | 3/2003 | Houle | 210/104 |
| 6,630,072 | B2 * | 10/2003 | Hoffland | 210/620 |
| 6,641,720 | B1 * | 11/2003 | Crompton et al. | 210/155 |
| 6,663,752 | B2 * | 12/2003 | Santilli | 204/164 |
| 6,773,594 | B1 * | 8/2004 | van der Wijngaart | 210/605 |
| 6,824,682 | B2 | 11/2004 | Branson | |
| 7,015,028 | B2 | 3/2006 | Choate et al. | |
| 7,078,229 | B2 | 7/2006 | Dvorak | |
| 7,105,088 | B2 | 9/2006 | Schien et al. | |
| 2002/0030012 | A1 * | 3/2002 | Sullivan et al. | 210/631 |
| 2003/0038078 | A1 * | 2/2003 | Stamper et al. | 210/603 |
| 2003/0111410 | A1 * | 6/2003 | Branson | 210/603 |

FOREIGN PATENT DOCUMENTS

| | | | |
|---|---|---|---|
| FR | 2844804 A1 * | 3/2004 | |
| WO | WO 99/56073 | * | 11/1999 |
| WO | WO 2004/046279 A1 * | 6/2004 | |
| WO | WO 2005/035697 | * | 4/2005 |

* cited by examiner

METHODS AND SYSTEMS FOR CONVERTING WASTE INTO ENERGY

CROSS-REFERENCE TO RELATED APPLICATIONS

This application is a divisional of commonly assigned U.S. patent application Ser. No. 10/812,153, filed Mar. 29, 2004, (now U.S. Pat. No. 7,105,088) which is hereby incorporated by reference in its entirety.

BACKGROUND OF THE INVENTION

This invention relates generally to the problems associated with waste in animal confinements, and more specifically, to methods and systems for converting the resulting high concentrations of animal waste into useful energy.

Animals have been raised for centuries for food. Previously animals grazed in fields or pens, and were at times confined to buildings for shelter. However, current state of the art animal production for swine, cattle, and other animals, includes housing large numbers of such animals in high concentration within confined buildings, and delivering food to the animals. This method of animal production has benefited consumers of meat by lowering food prices through increased efficiency. A drawback to the current methods of animal production includes the resulting high concentration of wastes that have to be removed from the buildings and disposed of in a safe manner.

Typically, the waste is removed from animal confinement buildings and deposited into large lagoons. Once within these lagoons, which can be multi-acre in size, the waste decomposes. The solid and liquid wastes in the lagoons cause an odor problem for the surrounding area, both as it decomposes in the lagoon, and during field application as a fertilizer as further described.

After partially decomposing, the waste from the lagoons is applied to land (e.g. fields where crop are grown) as a fertilizer. The potential for environmental contamination during field application of the waste is substantial and many fields in pork producing states have been over fertilized. In addition, some of the applied fertilizer can become windborne during application and is therefore a source of environmental contamination for adjacent areas.

There are also additional weaknesses with waste lagoon technology, specifically, collapsed walls and ground leaching, both of which can contribute to waterway and well contamination. In a recent EPA report, 60% of the US streams identified as "impaired" were polluted by animal wastewater. Animal wastewater management has become a high priority for the EPA.

Still another problem with current animal production methods is that air cycled through the confinement buildings to keep the animals cool is blown into the atmosphere through the fans at the end of these confinement buildings. This is another source of airborne waste in addition to the fertilizer application problems described above. Another problem caused in part by the airborne waste is an increased susceptibility to respiratory and other health problems in farm workers. Legislative pressures have forced at least one state to impose a moratorium on new swine confinements, and other states are predicted to follow.

There have been numerous attempts to improve the current state of the art in animal production, but most of these attempts still include drawbacks. For example, some still require a waste lagoon. Another system uses an inclined belt to concentrate solids percentage of waste, but does not eliminate or gain beneficial results from the solid waste. Other systems are known in which the wastes are eliminated by burning, but the burning of such wastes is not utilized to provide a beneficial result. Other systems treat waste through chemicals, but the waste is returned to the environment as a dried sludge. Additionally, anaerobic digestion systems exist.

There are additionally several energy conversion processes known but these systems do not describe any methods for getting the waste to the conversion system, nor the overall process of handling the animal waste.

BRIEF DESCRIPTION OF THE INVENTION

In one aspect, a method for receiving animal waste from animal confinements or other concentrated animal waste sources and converting the waste into a usable form is provided. The waste contains liquids and solids and the method comprises separating the liquids and solids into separate waste streams and controlling an amount of moisture in the solids waste stream such that the amount of moisture in the solid waste stream is compatible with a selected energy conversion process. The method further comprises feeding the moisture controlled solid waste into the energy conversion process.

In another aspect, a system for processing a waste stream from animal production confinements and other sources of concentrated wastes is provided. The system comprises a solids/liquids separator receiving the waste stream and configured to separate the waste stream into a solid waste stream and a liquid waste stream and a water treatment apparatus for treating the liquid waste stream. The system further comprises a control system for controlling an amount of moisture in the solid waste stream, an energy conversion processor receiving the moisture controlled solid waste stream and converting the solid waste stream into an energy source, and a power generator configured to utilize the energy source.

DETAILED DESCRIPTION OF THE INVENTION

The systems herein described provide methods for handling raw animal waste and converting the waste into fuel, which may then be used for heat, transportation, or preferably direct conversion to power through a generator driven by an engine or combustion turbine.

Figure 1:
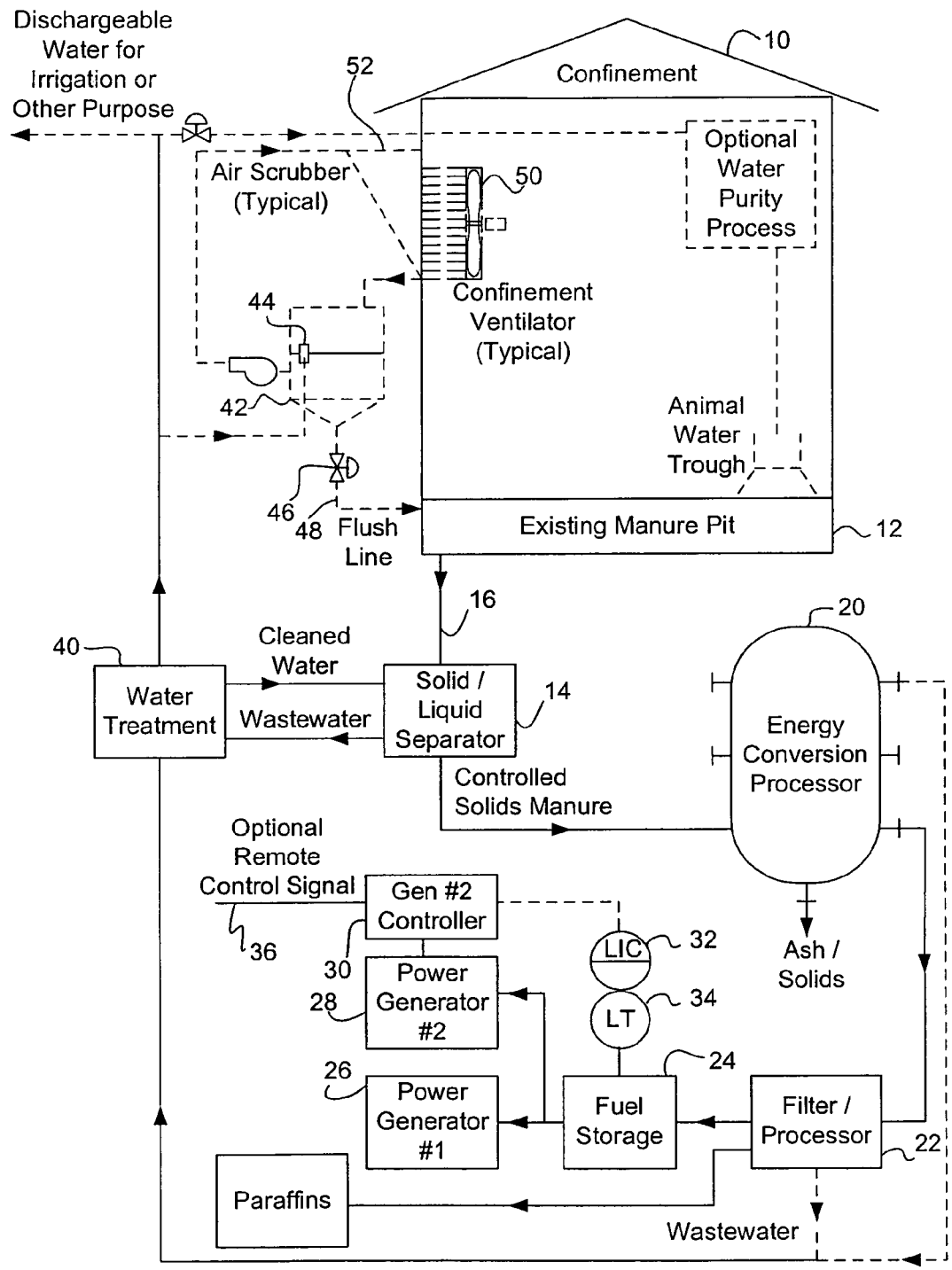
FIG. 1 is an overall conversion process diagram of a system for converting a waste stream into a fuel source, including a solids/liquids separator.

Referring to FIG. 1, animal confinement 10 includes a manure collection area 12 for the collection of wastes and flushing water. The wastes and flushing water are transported to solid/liquid separator 14 utilizing a transporting mechanism 16. In one embodiment, transporting mechanism 16 operates by gravity, but other embodiments of transporting mechanism 16 exist which may also use pumps and/or conveyors in addition to or instead of gravity to transport animal waste and other accompanying materials. As used herein, the term "transport" is utilized to describe methods for moving mass from one location to another, including, but not limited to, pumping, gravity, auger, conveyor, and the like.

In a specific embodiment, a positive displacement pump designed for high solids contents is utilized for transporting animal waste from collection area 12 to solid/liquid separator 14. One positive displacement pump is a grinding pump, one example of which is a Moyno L-Frame progressing cavity pump.

Solid/liquid separator 14 may include one or more mechanical and gravity separators which are further described below. A gravity separator is sometimes referred to as a settling tank. In one embodiment, solid/liquid separator 14 is utilized to deliver volatile solids from the waste, which have a significant BTU content for use as fuel, to an energy conversion processor 20. As further described below, the solid wastes are delivered to energy conversion processor 20 within a specified range of moisture content.

The animal waste exiting manure collection area 12 is typically about 97% to about 99.5% liquid. This is a result of manure by nature being very wet. Additional moisture is added due to urine and the water used to flush the animal waste from confinement 10. Small additional amounts of water are contributed to the animal waste by sloppy drinking and animal cleaning. Hog manure, for example, is typically about 80%-90% liquid by weight.

Each embodiment of energy conversion processor 20 has a range for the moisture content of the solid waste being converted that enables proper conversion of the solid waste. For example, the well-known gasification process typically requires a relatively dry feedstock, for example, a fuel with about a 20% to about a 30% moisture level. By contrast, other conversion processes such as liquification or pyrolysis allow much wetter feedstock streams, up to about an 80% moisture level.

As described above, the animal waste is transported into energy conversion processor, which may use pyrolysis, gasification, or one of a number of related conversion processes that utilize controlled temperature, pressure, and time to convert the waste into a one of a fuel gas, an oil, a solid, or a combination thereof. The converted animal waste is referred to herein as "fuel".

From energy conversion processor 20, the fuel is filtered and processed by filter processor 22 as necessary for usage. In one embodiment, the system includes one or more optional fuel storage tanks 24, or buffer tank(s). The fuel is then converted into electricity through a known device such as an engine or turbine-driven generator 26.

In the embodiment illustrated, a second power generator 28 is illustrated. In many locations, electrical power is more valuable during "peak demand" periods. One feature of the system illustrated is that power generator 26 is utilized to supply a certain quantity of power, while second power generator 28 supplies another quantity. Power generator 26 and second power generator 28 may provide equal power or may provide different power amounts (i.e., be differently sized). In a particular embodiment, power generator 26 supplies electricity and engine heat sufficient to keep the processes of the illustrated system continuously running except for maintenance. Second power generator 28 is turned on when power demand is at a peak. In a specific embodiment, power generator 26 is a Kohler 150REOZV and second power generator 28 is a Kohler 500REOZV.

Operation of second power generator 28, in one embodiment, is controlled by a controller 30, which includes a timer (not shown), operating in conjunction with a level controller 32, having a sensor input 34. Controller 30 may also be controlled remotely by a remote signal 36 from a utility or an operator of the energy conversion system illustrated. This operation enables the energy conversion system to meet electrical load demand and also maximize economic benefit to the system's owner. Such operation provides benefits to the public and the electrical grid operators by reducing loading on transmission lines, by providing demand-based distributed generation. Additionally, fuel production will vary due to fluctuations in manure production and other factors. The twin power generator arrangement provides a solution for the fluctuations in fuel supply while allowing generators to run at peak efficiency.

There is typically wastewater generated by the energy conversion system in the conversion process, either within energy conversion processor 20 or in filter/processor 22. This wastewater is transported, by pump and/or gravity, to a water treatment apparatus 40, which removes any remaining entrained solids, liquids and gases to levels approved by the applicable authorities. Water from water treatment apparatus 40 is either discharged to water bodies, or used for crop irrigation, or any number of other useful purposes that displace water currently taken from ground sources and/or water bodies.

In a particular embodiment, the water is transported back to confinement 10 for a variety of purposes. As illustrated in FIG. 1, a holding tank 42 has a level control valve 44 that allows holding tank 42 to fill as needed. A control valve and/or pump 46 transmits the water through a flush line 48 into manure pit 12 as needed in order to provide the flushing water needed to clean manure out of confinement 10.

In one embodiment, water is also be pumped to devices which filter the air exiting confinement 10 via ventilation system 50. An example of such a device is an air scrubber 52 as described in U.S. Pat. No. 6,059,865. Water washes down an inclined plate (not shown) of air scrubber 52, as ventilation fans blow against the inclined plate. Odor containing particles and gases are captured within the water stream. This water is shown as being returned to holding tank 42. The water can alternately be returned to water treatment apparatus 40 or utilized directly for flushing of manure pit 12.

Figure 2:
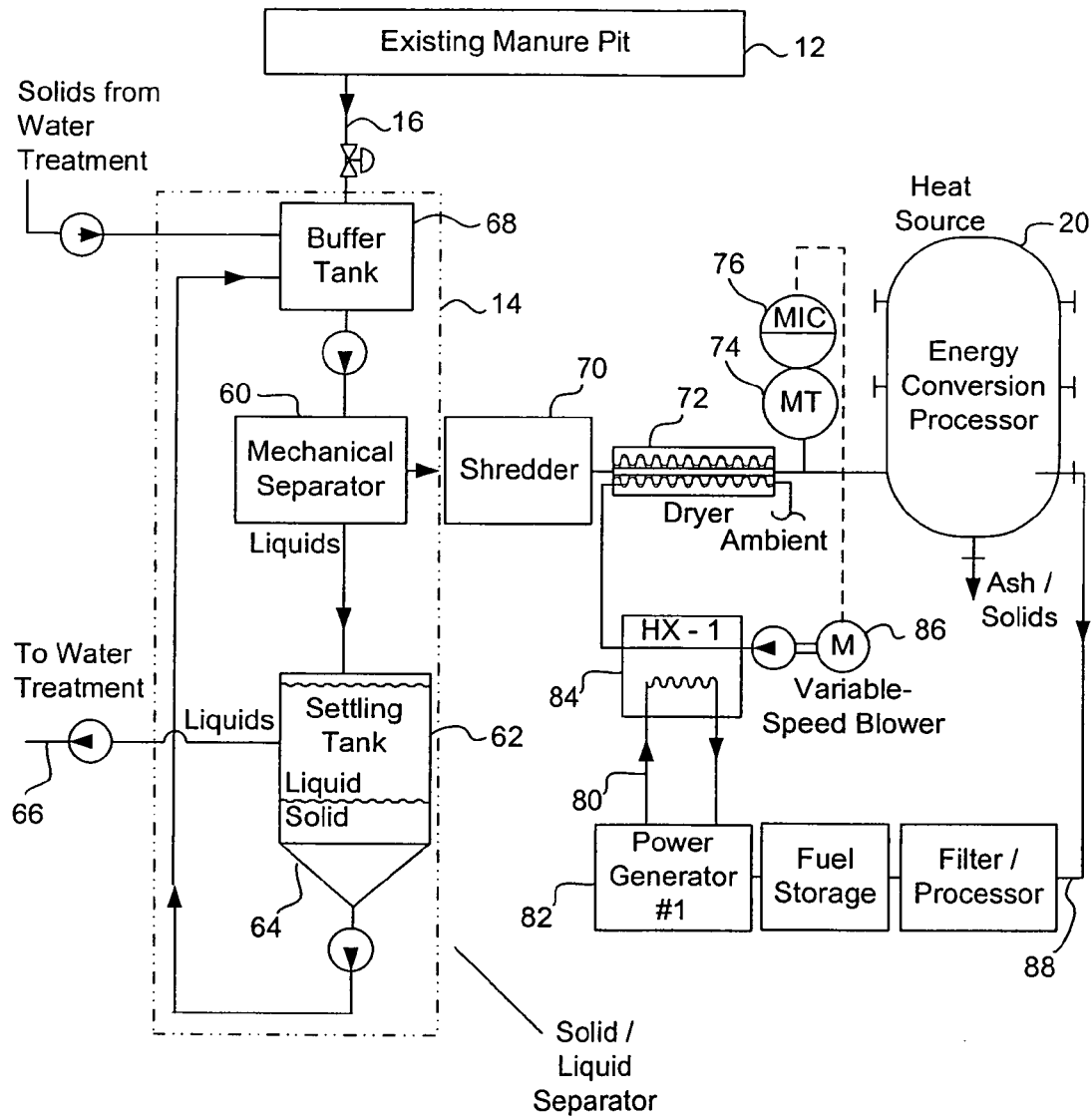
FIG. 2 is a block diagram of a portion of the system of FIG. 1, including an embodiment of a solids/liquids separator for a waste stream including a high solids concentration.

FIG. 2 illustrates one embodiment of solid/liquid separator 14 (shown in FIG. 1). Certain energy conversion processes utilize a low moisture level, for example, gasification. In such energy conversion processes, solid/liquid separator 14 may include one or more mechanical separators 60. Individual mechanical separators 60 may be a type of press (e.g., a belt press), an auger, a conveyor, a centrifuge, a hydrocyclone, a screen separator, or another type of mechanical separator, alone, or in conjunction with one or more other mechanical separators that work in conjunction to remove substantially all of the useful volatile solids from the waste. At least some known mechanical separation equipment leaves much of the useful volatile solids in the wastewater.

In the embodiment of solid/liquid separator 14 illustrated in FIG. 2, any solids retained in the waste are forwarded from mechanical separator 60 to settling tank 62, either by gravity and/or by pumping. Some examples of mechanical separator 60 are the KCS&C 48X30 Centrifuge, or Vincent KP-6L Screw Press. Settling tank 62 allows the retained solids to gravitate toward a bottom 64 of a fixed tank, while the liquid portion is forwarded for water treatment 66. In additional embodiments, settling tank 62 may include more than one settling tank in series or parallel. The solids that gravitate toward bottom 64 of settling tank 62 are transported back to mechanical separator 60, either directly, or to a buffer tank 68, as illustrated in FIG. 2.

The solids stream from mechanical separator 60 are forwarded, in one embodiment, to a shredder 70. A shredder 70 may not be needed for some animal waste streams, and its function may be replaced by a standard pump or a grinding pump. The waste is then transported, either by pump or gravity, to a dryer 72. In the embodiment shown in FIG. 2, dryer 72 is a helical auger in which heat and/or air is added to the unit, lowering the moisture content of the waste to meet the operating conditions of energy conversion processor 20. In the embodiment shown, moisture content of the waste is controlled by a moisture sensor 74 that monitors the amount of heat and airflow entering dryer 72. Moisture sensor 74 provides an analog or digital signal to the moisture controller (MIC) 76. Moisture controller 76 is configured to vary a process variable to control the moisture level of the waste within pre-defined limitations for use by energy conversion processor 20. A particular embodiment utilizes an Omega CDCE-90-1 moisture sensor, and an Omega CDCN-90 moisture controller. In this embodiment, moisture sensor 74 provides a proportional signal to moisture controller 76. An output of moisture controller 76 is utilized to control devices affecting the moisture percentage of the waste.

In particular embodiments, if moisture sensor 74 indicates that the moisture percentage is too high to be processed properly by energy conversion processor 20, then a hot air flow that is applied to the waste stream entering energy conversion processor 20 is increased. The hot air may be generated utilizing a variety of methods and one exemplary embodiment is illustrated in FIG. 2, where a coolant 80 from a power generator 82 is passed through a heat exchanger 84, where heat is transferred to the incoming air in order to raise its temperature, which increases its capacity to remove moisture from the process stream. A variable speed blower 86 has a variable frequency drive or other modulating device such as a mechanical damper, that is controlled by the signal output by moisture controller 76. In a specific embodiment, heat exchanger 84 is a pipe-in-pipe heat exchanger manufactured by a variety of other manufacturers and blower 86 is manufactured by the New York Blower Company.

In other embodiments, drying methods include raising the temperature of the waste through electric or fuel fired heaters or heat exchanged from other higher temperature areas of the process via fluid, gas or steam heat exchange media. Alternately, gases from engine exhaust of power generator 82 or energy conversion processor 20 can be utilized directly, similarly to the hot air embodiment above described.

In one embodiment, dryer 72 includes a perforated top screen (not shown) which allows the warmed moist air to escape. In other embodiments, the airflow is constant, but the amount of heat is varied, for example by a three-way valve modulating the amount of hot engine fluid (e.g., coolant 80) delivered to heat exchanger 84. Alternately other process variables such as rotation speed of dryer 72 or temperature of heating media may be controlled to obtain the same effect. Other heat sources may be used, such as engine exhaust from power generator 82, heat from energy conversion processor 20, heat from the process stream 88 after energy conversion processor 20, solar-heated thermal fluid, or heat from a separate combustion process, such as burning paraffins separated from the resultant fuel.

Figure 3:
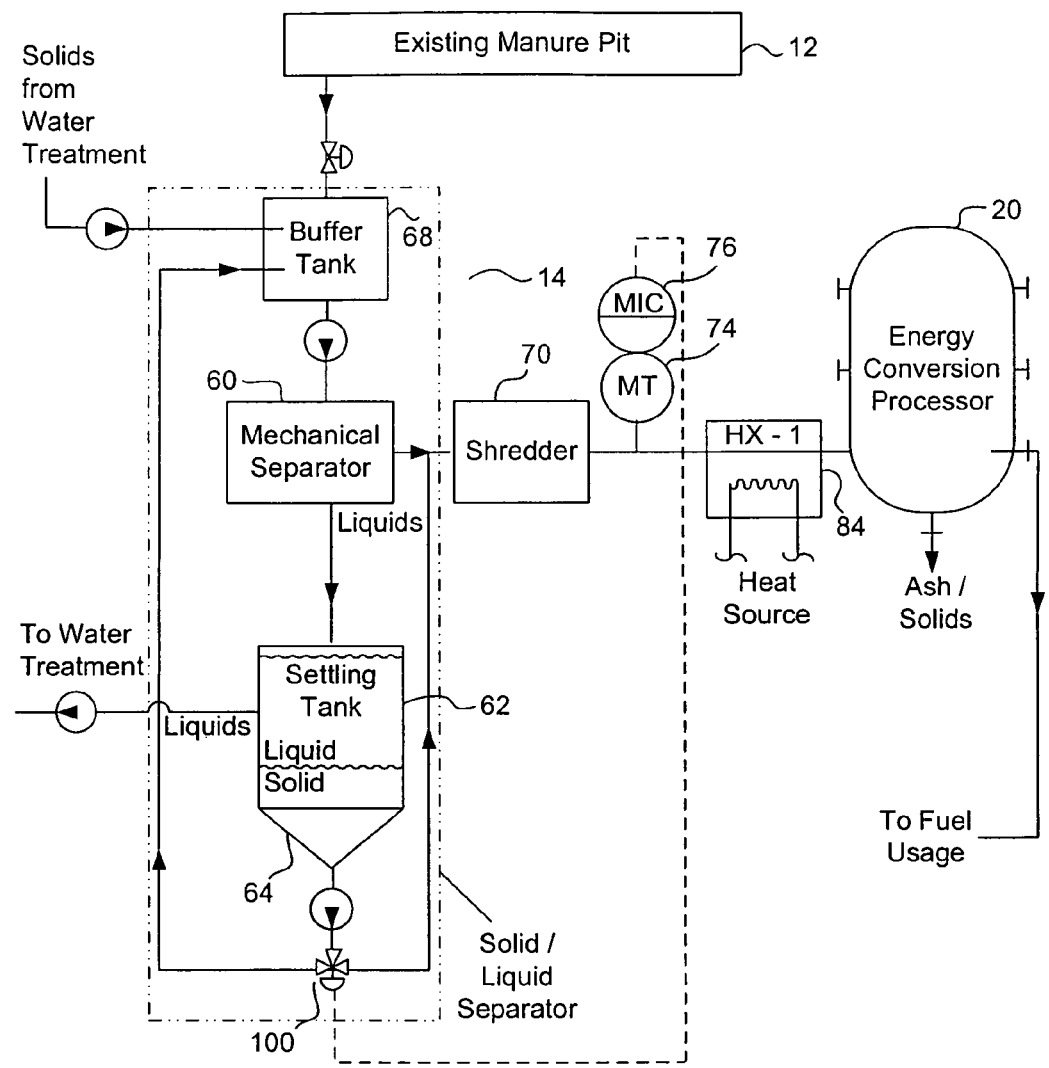
FIG. 3 is a block diagram of a portion of the system of FIG. 1, including an embodiment of a solids/liquids separator for a waste stream including a low solids concentration.

FIG. 3 illustrates an alternate embodiment where energy conversion processor 20 is configured to utilize or allow higher moisture content feedstock (e.g., animal waste streams). In this embodiment, a portion of the solids stream from settling tank 62 is delivered to the line which contains the solid portion from mechanical separator 60. The amount of this stream from settling tank 62 is controlled by moisture controller (MIC) 76, based on an input from moisture sensor 74 or a similar instrumentation means. Alternately the amount of solids from settling tank 62 is controlled by simple experimental manual balancing. In the embodiment illustrated a three way control valve 100 and moisture sensor 74 are used to control the amount of solids from settling tank 62 into the waste stream. Alternatively one or more two-way control valves or solenoid operated valves may be utilized.

The waste stream is exposed to heat from heat exchanger 84 before entry into energy conversion processor 20. The heat for heat exchanger 74 may be provided from a variety of sources. In a specific embodiment, heat may be provided to heat exchanger 84 from a power generator (shown in FIG. 1) from one or more of exhaust and engine cooling water. The waste stream in effect replaces the engine's radiator, in part or in whole. Additional heat sources may be used such as solar thermal, electric heat run by the unit's generator or other power source, or direct firing of a portion of the fuel, or waste fractions of the fuel. The heated waste is then transported to energy conversion processor 20 and processed as described with respect to FIG. 1.

Figure 4:
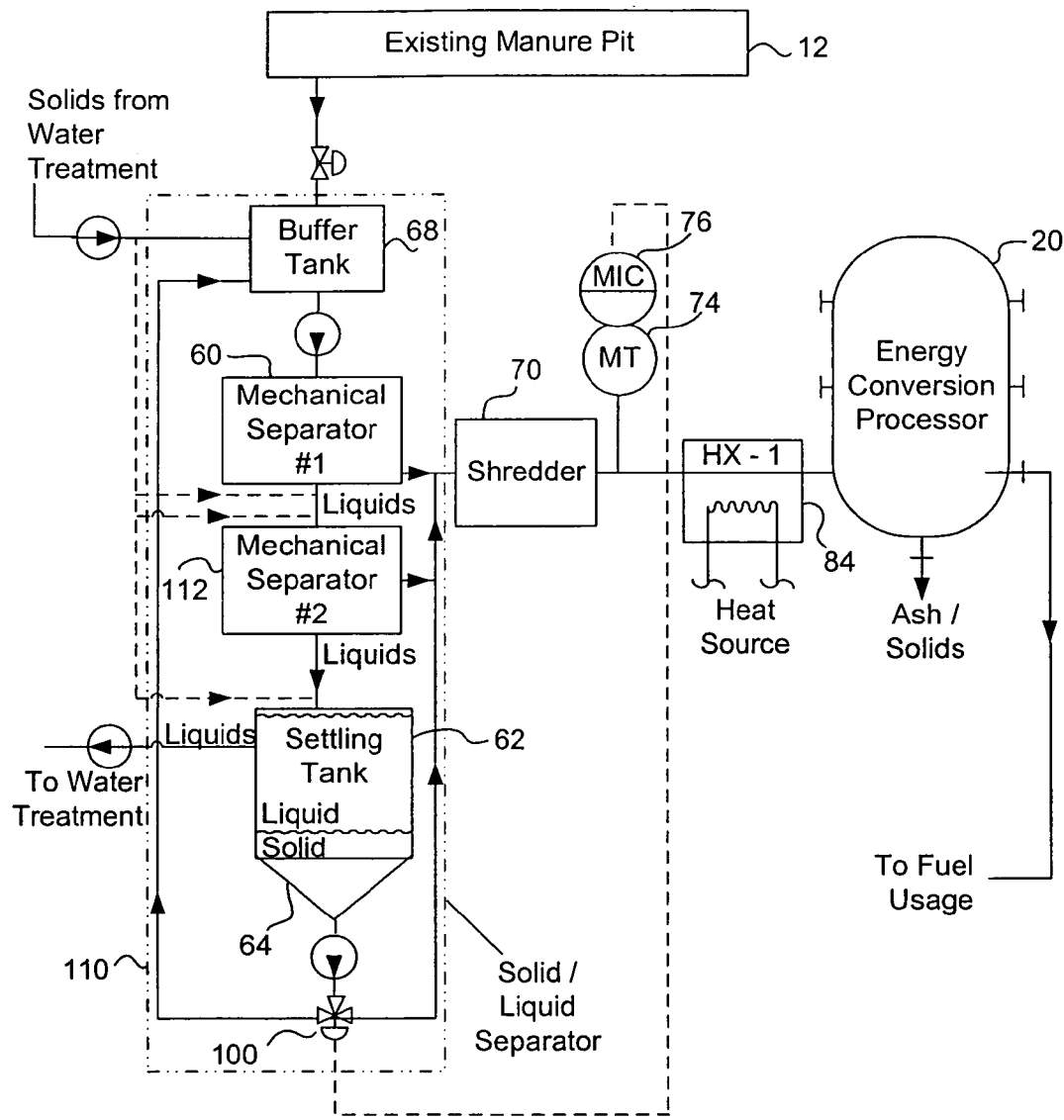
FIG. 4 is a block diagram of a portion of the system of FIG. 1, illustrating an embodiment having multiple mechanical solids/liquids separators.

FIG. 4 illustrates an alternate embodiment of a solids/liquids separator 110 for energy conversion system which increases efficiency of separation between solids and liquids in the waste stream. In addition to mechanical separator 60, a second mechanical separator 112 is included. Mechanical separator 60 and second mechanical separator 112 may be of the same type of construction, but in a specific embodiment, mechanical separator 60 is a highly energy efficient type separator, for example, a press, while second mechanical separator 100 is a more energy intensive separator, such as a centrifuge. In the embodiment, second mechanical separator 112 processes less mass flow than does mechanical separator 60 thereby raising overall efficiency of the energy conversion system. Specifically, mechanical separator 60 directs the high-solids fraction of the waste towards energy conversion processor 20, while a high-liquids fraction of the waste is transported to second mechanical separator 112. Second mechanical separator 112 also directs its high-solids fraction toward energy conversion processor 20, while the high-liquids fraction is directed to settling tank 62. From settling tank 62, a high-solids fraction of the waste is directed back to buffer tank 68 or alternately to one or both of mechanical separators 60, 112 and another fraction is transported toward energy conversion processor 20. Three-way valve 100, which is controlled by moisture controller (MIC) 76, based on the input from moisture sensor 74. Three-way valve 100 varies the amount of high-solids waste fraction transported toward either energy conversion processor 20 and buffer tank 68, or alternately between first and second mechanical separators 60, 112.

Figure 5:
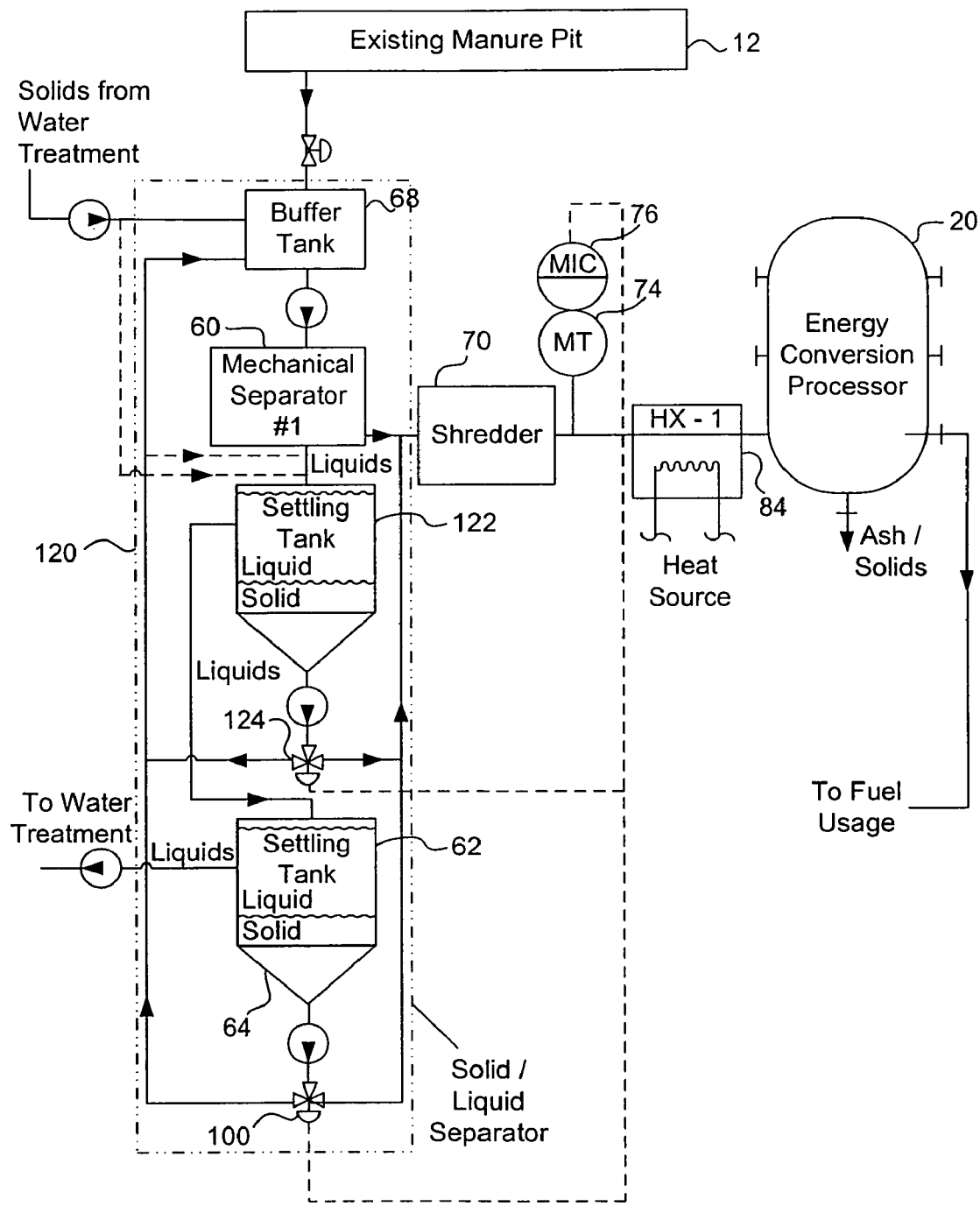
FIG. 5 is a block diagram of a portion of the system of FIG. 1, illustrating an embodiment having multiple gravity solids/liquids separators.

FIG. 5 illustrates another embodiment of a solids/liquids separator 120 for energy conversion system which also increases efficiency of separation between liquids and solids in a waste stream. Solids/liquids separator 120 includes a second settling tank 122, which may be of the same type of construction as settling tank 62, but typically will have a different geometry. Settling tank 122 directs the high-solids fraction of the waste towards energy conversion processor 20, while the high-liquids fraction of the waste from second settling tank 122 is transported to settling tank 62. Settling tank 62 transports its high-liquids fraction to waste water treatment (e.g., apparatus 40 shown in FIG. 1). The prime advantages of gravity separation utilizing settling tanks are low energy consumption and high recovery of solids. Putting two gravity separators in series (i.e., settling tanks 62 and 122) downstream of mechanical separator 60 is thought to recover approximately 97% of the solids. The high-solids fractions of waste from both gravity separators 62, 122 are transported back to buffer tank 68 or combined with an output from mechanical separator 60 and directed to shredder 70 and onto energy conversion processor 20. A three-way valve 124 operates in the same fashion as three way valve 100 described above, that is, controlled by moisture controller (MIC) 76, based on an input from moisture sensor 74. Three-way valves vary an amount of high-solids waste transported toward energy conversion processor 20, buffer tank 68, and mechanical separator 60.

For all of the above described embodiments, it should be easily understood that many variations can be made and still be within the spirit and scope herein described. For example, altering the arrangements and quantity of separators, such as three or more separators in a parallel or series-parallel arrangements are certainly contemplated.

Figure 6:
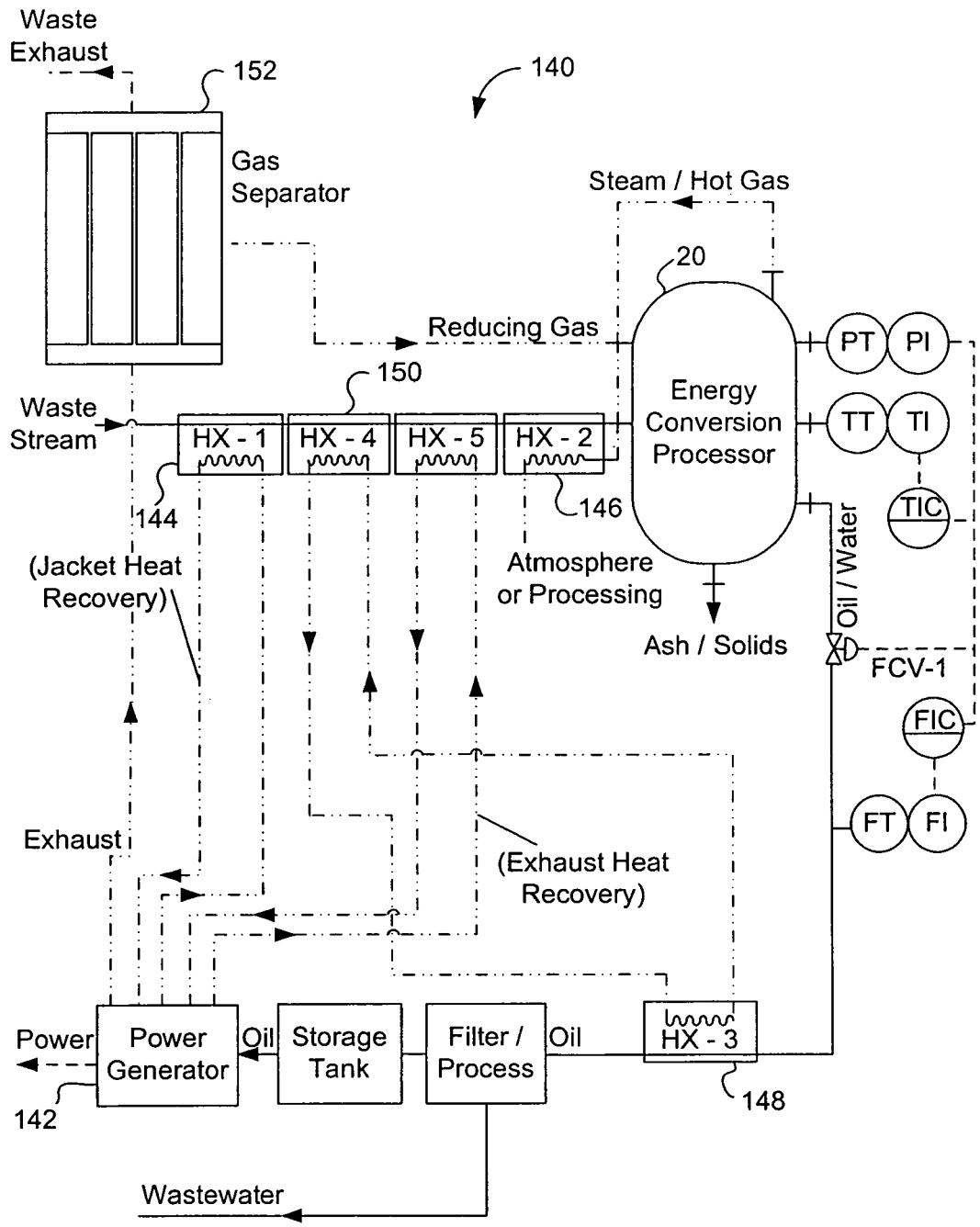
FIG. 6 is a block diagram of a portion of the system of FIG. 1, illustrating an embodiment of a heat and gas recovery sub-system.

FIG. 6 displays one embodiment of a heat recovery system 140 which may be utilize to improve and/or optimize the processes performed by the energy conversion system. In the illustrated embodiment, the waste stream is heated via heat recovered from the cooling fluid of power generator 142, typically a glycol/water mix, via heat exchanger 144. The waste is further heated in a second heat exchanger 146, using steam and/or exhaust gases available from energy conversion processor 20. These may alternately be taken from a vessel within energy conversion processor 20 or a downstream apparatus such as a flash tank as utilized in the petroleum industry.

Another source of heat recovery is shown which circulates a heat transfer medium through heat exchangers 148, 150. The heat transfer medium transfers heat from the hot fuel from energy conversion processor to the incoming waste stream, preheating it, raising overall efficiency.

Additional process control instrumentation is also illustrated in FIG. 6 by way of example only. Recovery of constituents of exhaust gases is important with certain embodiments of energy conversion processor 20. For example, one embodiment of energy conversion processors require carbon monoxide (CO) and/or carbon dioxide (CO2), which are readily available in significant quantities from the exhaust of an engine and/or combustion processes. In the embodiment shown, a portion of the exhaust gas is separated by gas separator 152 for delivery to energy conversion processor 20. The exhaust gas may be filtered, or chemically converted (for example converting CO2 into CO and O2) to deliver the desired gas or gases to energy conversion processor 20. In one embodiment, membrane technology is utilized within gas separator 152 to concentrate the amount of one gas, for example CO, for delivery into the process. Other more complex gas separation methods such as pressure-swing absorption, vacuum swing absorption, chemical separation, catalytic separation, and other gas separation methods may be utilized to accomplish the same goal of delivering a more desirable mix of gas to energy conversion processor 20. The gas separation process typically utilizes a compressor for the feed gas (exhaust), or one or more vacuum pumps.

Figure 7:
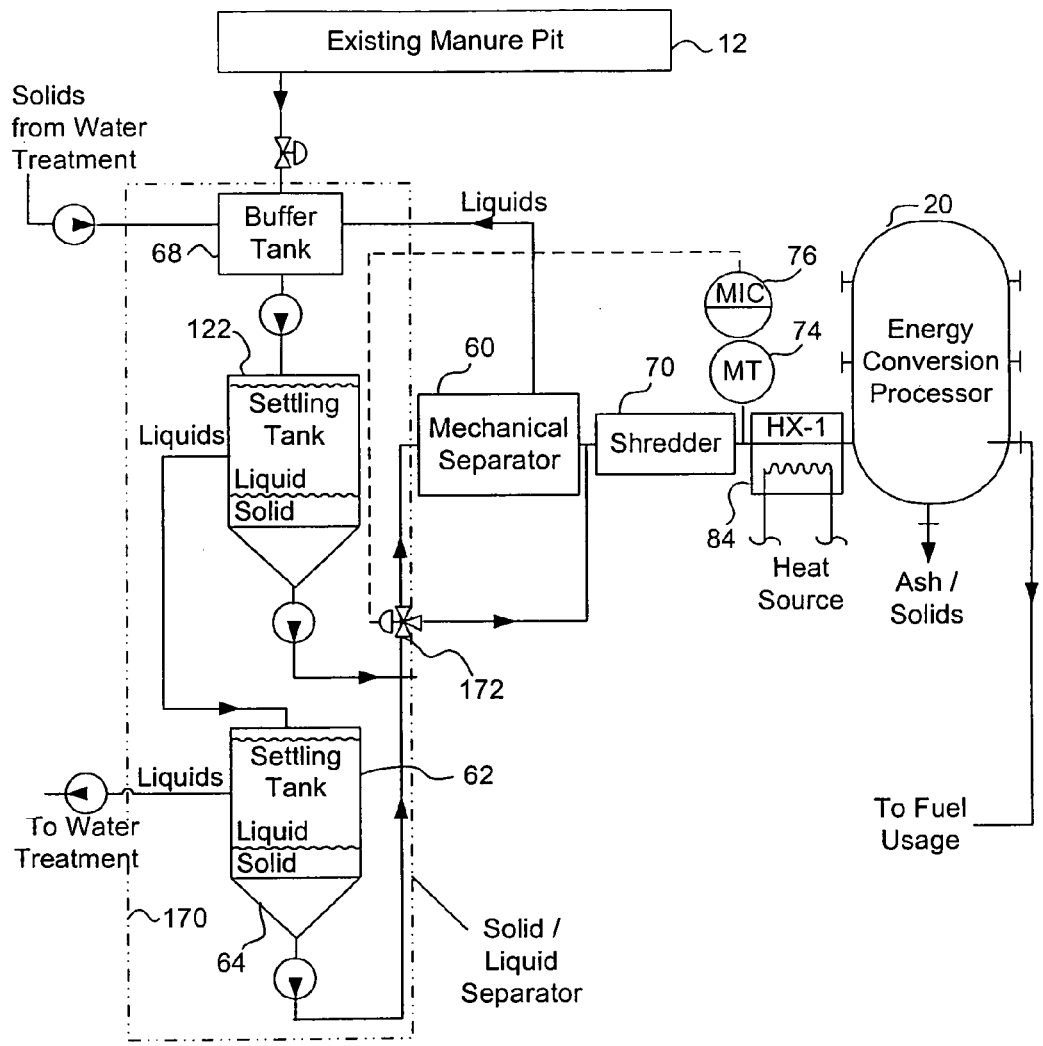
FIG. 7 is a block diagram of a portion of the system of FIG. 1, illustrating an embodiment having multiple gravity solids/liquids separators routed to a mechanical separator.

FIG. 7 illustrates another embodiment for a solids/liquids separator 170 for an energy conversion system which controls a solids percentage, primarily for a low-solids energy conversion processor 20. Solids/liquids separator 170 includes one or more gravity separators (settling tanks 62, 122 shown). The high-solids fraction of the waste from each settling tank 62, 122 is transported toward energy conversion processor 20, except that a fraction of the high-solids fraction is directed through mechanical separator 60, which raises the solids percentage of the waste to a desired level for input into energy conversion processor 20. A three-way valve 172 is controlled by the moisture controller (MIC) 76, based on an input from moisture sensor (MT) 74. Three-way valve 172 could alternately be a combination of two-way valves and/or manual valves. The liquid fraction of the waste from mechanical separator 60 can alternately be transported to buffer tank 68 or directly to one of settling tanks 62, 122.

Figure 8:
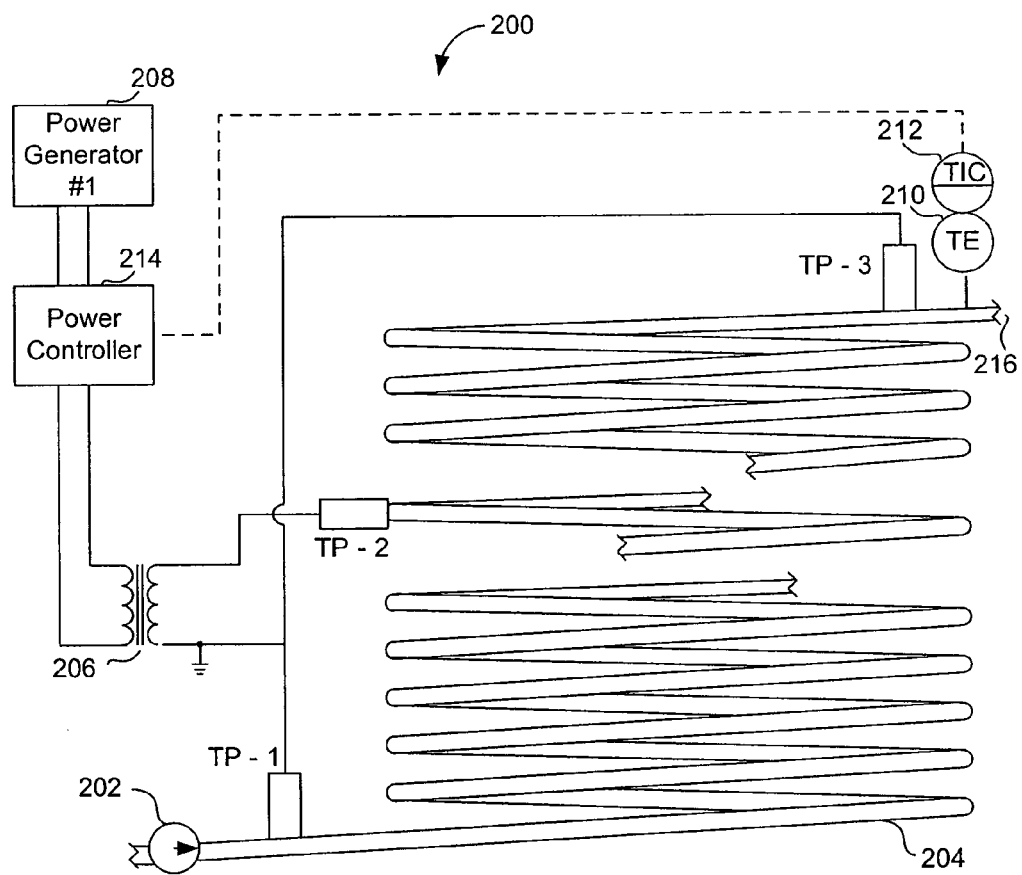
FIG. 8 is a block diagram of one embodiment of an energy conversion processor.

FIG. 8 illustrates one example of an energy conversion processor 200. In the example illustrated, pump 202 raises pressure of the waste within energy conversion processor 200. As described above, the waste has been controlled to a specified moisture level. The waste is pumped through a length of tubing 204. A example includes 1000' of 1.5 inch NPS Schedule 80 304ss with an inside diameter of about 1.5", which coiled in about a 12 foot diameter, with 27 turns. A flowrate of approximately 4.6 gpm is pumped into energy conversion processor 200. A step down transformer 206 converts 480 volt, single phase power from power 208 generator to a low voltage, for example 30 VAC. Temperature sensor 210 provides a signal to temperature controller 212. The amount of power from power generator 208 delivered to energy conversion processor 200 is controlled by power controller 214. Power controller 214, in one embodiment, is the phase angle SCR (Silicon Controlled Rectifier) type or another similar type. A specific SCR type power controller is supplied by EuroTherm. Power controller 214 delivers an amount of power to step down transformer 206 proportional to the signal received from temperature controller 212. Power controller 214 regulates the voltage applied to the primary of transformer 206, which regulates the voltage applied to energy conversion processor 200 by the same ratio. Such an arrangement maintains the temperature of the waste at the outlet 216 of energy conversion processor 200. Another embodiment, not shown, utilizes multiple zones, for example, two transformers 206, two power controllers 214, two temperature sensors 210, and two temperature controllers 212, where each zone may have differing temperature setpoints or the same temperature setpoint to have a zone of temperature rise rather then a zone of maintaining temperature.

In one embodiment, tubing 204 of energy conversion processor 200 includes a jacketed pipe wherein heat from a power generator is applied as one of heated fluid or heated gas to the jacketed pipe to maintain desired temperature setpoints. In this and other embodiments, heat from a power generator is therefore applied to the waste stream within energy conversion processor (20, 200) by one or more of impedance and induction, in one or more distinct zones of heating.

The above described embodiments are utilized to control an amount of moisture within a waste stream to attempt to provide an optimum waste for the particular energy conversion processor 20. When energy conversion processor 20 is a gasification processor, a moisture percentage entering mechanical separator 60, for example, an inclined screw press, is about 95%. The moisture percentage in the high-solids stream exiting mechanical separator 60 is about 65%. The mass fraction of solids forwarded to shredder 70 is then about 30%. The remaining 70% mass fraction of waste is forwarded to a gravity separator (e.g., settling tank 62). The solid fractions in the gravity separator are continually recycled to buffer tank 68, where it is mixed with fresh slurry and reintroduced into mechanical separator 60. For the waste stream exiting shredder 70, hot air is introduced into dryer 72 (shown in FIG. 2, and is regulated as described above to reduce the moisture percentage in the waste stream being fed to energy conversion processor 20 to about 25%.

When energy conversion processor 20 is a pyrolysis or liquification processor, a moisture percentage entering mechanical separator 60, for example, a solid bowl basket centrifuge, is about 97%. The moisture percentage in the high-solids stream exiting mechanical separator 60 is about 72%. The mass fraction of solids forwarded to shredder 70 is then about 65%. The remaining 35% mass fraction is forwarded to a gravity separator (e.g., settling tank 62). The moisture percentage of the solid fraction in the gravity separator is about 90%. The flow from gravity separator is divided at a three-way valve, with nominally 50% of the flow directed to the pipe connecting mechanical separator 60 and shredder 70. This results in a desired mixture moisture percentage of about 80% in this case. The three-way valve position is regulated as previously described, to maintain this moisture percentage setpoint. The remaining high-solids stream from the gravity separator is continually recycled to buffer tank 68, where it is mixed with fresh slurry and reintroduced into the mechanical separator.

The above described embodiments and examples serve to illustrate how control of moisture content from a waste stream is utilized by a number of different energy conversion processor types in order to provide a method for disposing of and gaining beneficial use from animal production waste streams. The above described embodiments also do not involve methods that contribute to odor released into the atmosphere, providing a more desirable approach to the problem of animal production waste than known solutions which include lagoons and field spreading.

While the invention has been described in terms of various specific embodiments, those skilled in the art will recognize that the invention can be practiced with modification within the spirit and scope of the claims.

What is claimed is:

1. A method for receiving animal waste from animal confinements or other concentrated animal waste sources and converting the waste into a usable form, the waste containing liquids and solids, said method comprising:
   separating the liquids and solids into separate waste streams, wherein separating the liquids and solids includes recovering a portion of the solids from the waste stream using at least one mechanical separator and recovering further solids from the waste stream utilizing one or more gravity separators, and wherein the solids recovered from the mechanical separator and from the gravity separator are combined directly into a high-solids waste stream;
   controlling an amount of moisture in the high-solids waste stream such that the amount of moisture in the high-solid waste stream is compatible with a selected energy conversion process; and
   feeding the moisture controlled high-solid waste into the energy conversion process.

2. A method according to claim 1 further comprising utilizing the energy conversion process to convert the moisture controlled high-solid waste into one or more of a fuel, heat, and power.

3. A method according to claim 1 wherein controlling an amount of moisture in the high-solids waste stream comprises heating the high-solids waste stream to control a moisture content of the high-solids waste stream.

4. A method according to claim 1 wherein separating the liquids and solids comprises routing the waste to one or more of at least one settling tank, the at least one mechanical separator, and at least one buffer tank.

5. A method according to claim 4 wherein the at least one mechanical separator is one or more of a belt press, a press, an auger, a conveyor, a centrifuge, a hydrocyclone, and a screen separator.

6. A method according to claim 1 further comprising adding heat to control a moisture content of the high-solids stream.

7. A method according to claim 1 wherein controlling an amount of moisture in the high-solids waste stream comprises utilizing a combination of pressure, temperature and time to control moisture of the solids waste stream for one or more of gasification, pyrolysis, and liquification to convert the high-solids waste stream into fuel.

8. A method according to claim 1 further comprising:
   removing further solids from the liquid waste stream;
   treating the liquid waste stream resulting in water; and
   recycling the water.

9. A method according to claim 8 wherein recycling the water comprises one or more of discharging the water for irrigation of cropland; delivering the water to animal confinement ventilation filtration units to capture airborne particles and gases, returning the water to a manure pit for flushing and cleaning of the pit, and delivering the water to animals for drinking.

10. A method according to claim 1 further comprising:
    converting the moisture controlled high-solid waste into a fuel;
    using the fuel in a power generation device; and
    recovering heat from at least one of cooling water of the power generation device and exhaust from the power generation device to preheat the high-solids waste stream.

11. A method according to claim 1 further comprising:
    converting the moisture controlled high-solid waste into a fuel; and
    recovering heat from at least one of the fuel, steam, hot gasses, and hot fluid exiting the energy conversion process to preheat the high-solids waste stream.

12. A method according to claim 1 wherein controlling an amount of moisture in the high-solids waste stream to be compatible with an energy conversion process comprises:
    heating the high-solids waste stream to be applied to the energy conversion process using a heating and drying source;
    sensing an amount of moisture in the heated high-solids waste stream to be applied to the energy conversion process with a moisture sensor;
    sensing an output of the moisture sensor with a moisture controller; and
    controlling the heating and drying source with the moisture controller to control an amount of moisture in the high-solids waste stream to the energy conversion process.

* * * * *

UNITED STATES PATENT AND TRADEMARK OFFICE
CERTIFICATE OF CORRECTION

| | |
|---|---|
| PATENT NO. | : 7,597,812 B2 |
| APPLICATION NO. | : 11/506011 |
| DATED | : October 6, 2009 |
| INVENTOR(S) | : Schien et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-eighth Day of September, 2010

David J. Kappos
*Director of the United States Patent and Trademark Office*